3,058,938
PROCESS OF PREPARING AQUEOUS COPOLYMER LATEX OF METHYL-ACRYLATE AND MONO-VINYLIDENE AROMATIC HYDROCARBON MONOMER AND RESULTING PRODUCT
Mary D. Lindstrom and Joel Fantl, Springfield, Oscar P. Cohen, Longmeadow, and John F. Heaps, Springfield, Mass., assignors to Monsanto Chemical Company, St. Louis, Mo., a corporation of Delaware
No Drawing. Filed Mar. 5, 1958, Ser. No. 719,196
10 Claims. (Cl. 260—29.6)

The present invention is directed to vinylidene latices and more particularly to latices of this type adapted for use in coatings or cellulosic materials used in dispensing foods.

The dispensing of foods in disposable containers presents certain technical problems. This is particularly true when the food is of a hot liquid nature such as coffee, chocolate, soup, etc. and the containers are cellulosic materials such as paper. Containers made of uncoated paper which are intended to contact the mouth meet with considerable opposition in that the contents, particularly when hot, permeate the material, adversely affecting its strength and appearance. Also the contents solvate certain residual treating agents affecting the taste of the contents, and finally, the sensation of contacting uncoated paper is considered by many to be unpleasant.

As a result of the foregoing it has now become standard practice to coat the containers or the materials from which the containers are to be fabricated with various waxes, synthetic rubber latices, or synthetic polymer latices etc. However, none of the coating materials used to date have fully met the standards for performance required for such applications. In this respect, the coating material should be of low viscosity for ease of application by spraying or flush coating and be capable of forming a film under drying conditions of approximately 150° C. for three minutes. The coating which results should be glossy, flexible, non-yellowing, non-staining, non-blocking and have minimum odor emission when exposed to boiling water.

Accordingly, it is the principal object of the present invention to provide vinylidene interpolymer latices which can be coated on cellulosic substrates used in dispensing foods.

Other objects of the invention will in part be obvious and will in part appear hereinafter.

These and other objects of the present invention are obtained by providing interpolymer latices comprising (a) methyl acrylate and (b) a hardening comonomer selected from the class consisting of monovinylidene aromatic hydrocarbons, substituted monovinylidene aromatic hydrocarbons and mixtures thereof, said interpolymers being of the type provided by a particular emulsion polymerization process.

The following examples are given in illustration of the present invention. Where parts are mentioned, parts by weight are intended unless otherwise designated.

*Example I*

| Kettle charge: | Weight percent |
|---|---|
| Alkylaryl polyether alcohol | .192 |
| Tetrasodium pyrophosphate | .020 |
| Sodium salt of sulfosuccinic acid ester | .038 |
| Ethylene maleic anhydride (Sp. vis. 0.1 as a 1% solution in dimethylformamide at 25° C.) | .079 |
| Ammonium hydroxide (29% in water) | .192 |
| Water | 38.6 |
| Catalyst premix: | |
| Potassium persulfate | .253 |
| Water | 9.49 |
| Monomer charge A: | |
| Styrene | 14.4 |
| Sodium salt of sulfosuccinic acid ester | .154 |
| Monomer charge B: | |
| Methyl acrylate | 21.6 |
| Styrene | 2.4 |
| Sodium salt of sulfosuccinic acid ester | .307 |
| Neutralization: Ammonium hydroxide (29% in water) | .766 |
| Stabilizer addition: | |
| Butyl half-ester of styrene maleic anhydride | 1.54 |
| Water | 9.96 |

The kettle charge is added to a 2-liter, round-bottomed, four-necked flask fitted with a reflux condenser, thermometer, agitator, monomer-dropping funnel and catalyst-dropping funnel. The charge is subjected to heating, allowing it to reflux, and stirred. While maintaining the temperature and stirring, add about 83% of the catalyst premix, slowly and continuously, at constant rate, over a period of about 160 minutes. During the first 50 minutes of the catalyst addition, add monomer charge A at constant rate, and over the remainder of the period add monomer charge B also, at constant rate. Between 20 and 30 minutes after the additions have been completed a mild temperature peak is observed at which time the remaining 17% of the catalyst charge is added. Reflux is continued for an additional 60 minutes, after which the batch is cooled, neutralized with ammonium hydroxide (neutralization charge), then screened through cheesecloth, after which the stabilizer addition is added.

The resulting product is observed to be a stable milkwhite latex which when tested on a Brookfield viscometer has a viscosity of less than 40 cps.

The latex is flush-coated or spray-coated on the interior of paper cups and when dried at 150° C. for three minutes a glossy continuous film results which remains flexible, non-yellowing on aging, and non-staining when exposed to hot coffee. A cup so coated is filled with hot water, then covered for five minutes. When the cover is removed, no odor is detected in the steam evolved.

In order to test for blocking, a circular disc 1" in diameter is cut from the bottom of a cup coated as above and contacted at the coated side with a similar disc of uncoated paper, and the assembly placed in a drying oven. A weight is placed on the assembly as to give one lb./square inch pressure. The oven is maintained at 190° F. and 100% relative humidity for a period of eight hours after which the discs are removed from the oven. Upon removal the discs disengage solely as a result of gravity.

*Example II*

The procedure set forth in Example I is again followed with the exception that monomer charge B contains 2.0% acrylic acid.

When subjected to the boiling water test set forth in Example I, a noticeable odor is present in the steam evolved from the cup.

*Example III*

The procedure set forth in Example I is again followed with the exception that monomer change B contains 2.0% of methacrylic acid.

When subjected to the boiling water test set forth in Example I, a noticeable odor is present in the steam evolved from the cup.

*Example IV*

The procedure, as well as the constituents and amounts, of Example I is again used, with the exception that the monomer charges are reversed in the order of their addition to the kettle charge or medium. Monomer charge B is added over the first 50 minutes of the catalyst addition period followed by addition of monomer charge A over the remaining 110 minutes of this period.

When tested in the viscometer the latex which results exhibits a viscosity of 40 cps. Brookfield, but when coated on paper substrates and dried according to the procedure set forth in Example I the latices do not form continuous films.

*Example V*

The procedure, as well as the constituents and amounts, set forth in Example I is again followed with the exception that the monomer charges are charged simultaneously to the polymerization medium over a period of 160 minutes.

When tested for viscosity a reading of 30 cps. Brookfield is observed. When coated on paper cups and subjected to the drying procedure set forth in Example I the latex fails to form a continuous film.

The present invention is directed to monovinylidene interpolymer latices adapted for coating cellulosic substrates. These latices comprise (a) methyl acrylate and (b) a hardening comonomer selected from the class consisting of monovinylidene aromatic hydrocarbons, substituted monovinylidene aromatic hydrocarbons and mixtures thereof which result from a peculiar catalytic emulsion polymerization process. This process involves providing an aqueous medium containing a polymerization emulsifier in a reaction vessel, at polymerization temperature and agitation. While so maintained an aqueous composition containing polymerization catalyst is added thereto slowly and continuously at a substantially constant rate over a period of greater than about 140 minutes. Simultaneously with the catalyst addition two monomer charges are added in sequence, similarly at constant rate. The first monomer charge constitutes essentially hardening comonomer while the second monomer charge comprises the remainder of the monomers of which 5–25% and preferably 5–10% is hardening comonomer on the total weight of the monomers. The first monomer charge is added over an elapsed time of greater than about 50 minutes while the second monomer charge is carried out over the remainder of the catalyst addition period.

The monomeric constituents which can be included in the present invention are methyl acrylate and a hardening comonomer. The amount of methyl acrylate can vary from 45 to 65% of the interpolymer weight with a further preference directed to 50 to 60% by weight. Low concentrations of the acrylate detracts from the flexibility of the resulting product while higher concentrations show a tendency toward blocking. The hardening comonomer which can be included are monovinylidene aromatic hydrocarbons, susbtituted monovinylidene aromatic hydrocarbons and mixtures thereof. These include styrene, alpha-methyl styrene, o-methyl styrene, m-methyl styrene, p-methyl styrene, 2,4,-dimethyl styrene, 2,5-dimethyl styrene, 3,4-dimethyl styrene, 3,5-dimethyl styrene, 2,4,5-trimethyl styrene, 2,4,6-trimethyl styrene, 2,4,5-triethyl styrene, a-ethyl styrene, o-ethyl styrene, m-ethyl styrene, p-ethyl styrene, 3,5-diethyl styrene, p-n-butyl styrene, m-sec-butyl styrene, m-tert-butyl styrene, p-hexyl styrene, p-n-heptyl styrene, p-2-ethyl hexyl styrene, vinyl naphthalene, vinyl toluene, o-vinyl toluene, m-vinyl toluene, p-vinyl toluene, etc. and mixtures thereof. The preferred is styrene. The preferred amount of hardening comonomer ranges between 55 and 35% on the weight of the interpolymer with the further preference directed to 50 to 40% by weight.

The process presently sponsored contemplates the provision of a reaction medium denominated in the examples as the kettle charge. This comprises a polymerization emulsifier in aqueous composition, the former being chosen from a variety of non-ionic and anionic emulsifiers. The non-ionic emulsifiers which can be used are preferably alkaryl polyether alcohols, the preferred concentration of which varies from 0.1 to 1.0% by weight of the total latex. If an anionic type is chosen it should be of the sulfonated type, the concentration of which varies from 0.25 to 1.0% by weight of the total interpolymer latex. Anionic emulsifiers can also be added with the aqueous catalyst solution or mixed with the monomers. Preferably a portion of the anionic emulsifier is added with the monomeric charges. Various dispersants can be utilized with good advantage, preferably these are ethylene-maleic anhydrides having specific viscosity of less than 0.5 as a 1% solution in dimethylformamide at 25° C.

A polymerization catalyst contained in aqueous composition is added, at constant rate, slowly and continuously over a period of greater than about 140 minutes. The more preferred period of time is on the order of about 160 minutes. The catalysts are conventional for emulsion polymerizations including redox types used when operating at temperatures below reflux. The preferred concentration of catalyst varies from 0.01 to 1.0% by weight on the total interpolymer latices. In a preferred embodiment, a portion equal to the major part or about 80–85% of the catalyst charge is added conjunctively with the monomeric charge. The portion retained is added after the completion of the monomer addition, and insures reaction of residual monomer.

A quantity of water preferably accompanies both the polymerization emulsifier and the catalyst. The amount of water can vary from 50–70% by weight of the total interpolymer latex to give a preferred 50–30% solids product.

The monomeric components are added in distinctive charges accompanying the charging of the catalyst. The first charge constituting essentially styrene is added over a period of greater than about 50 minutes with a further preference directed to 50–70 minutes and still more particularly on the order of about 60 minutes. The second monomer charge constitutes the remainder of the monomers including all of the methyl acrylate and 5–25% of and preferably 5–10% styrene on the weight of the total monomers. The addition period constitutes the remainder of the catalyst addition period and more preferably is on the order of greater than 90 minutes with a further preference of 90–110 minutes.

After completion of the monomeric additions the polymerization is continued until the monomeric components are essentially polymerized. During this period as in the case of the addition period a temperature is preferably maintained high enough to allow the mixture to reflux. Twenty to 30 minutes after the monomer additions are completed the mixture will undergo a mild temperature peak at which time it is preferable to add a retained portion of the catalyst to insure polymerization of remaining monomer. Preferably the amount of catalyst so retained ranges 15 to 20%. Refluxing is then continued for about an hour at which time the reaction is substantially completed. Refluxing can be continued beyond this point if the occasion dictates. The temperatures which can be utilized range between 40 and 150° C., the preferred being on the order of 75° C. to 100° C.

After completion of the polymerization the various steps may be carried out in applying the resulting product to particular applications. In this respect, after cooling the mixture is neutralized with ammonium hydroxide or other reagents to a preferred pH of about 9–10 and the latices removed from the reaction mixture by conventional means as by screening through muslin, cheesecloth and the like. The latex product can be further stabilized by the addition of butyl half-esters of styrene-maleic-anhydride preferably used in the amount equal to 1–4% on the weight of the total.

The latices of this invention can be visualized as constituting an internal core comprising essentially polymerized hardening comonomers and a relatively soft shell or exterior comprising acrylate and a portion of polymerized hardening comonomer. The core constitutes 30–50% by weight and the shell 70–50% by weight of the interpolymer. The amount of acrylate in the shell ranges 45–65% on the weight of the total interpolymer. The polymerized hardening comonomer present in the shell comprises 25–5% of the total monomers. The initial 5% of this amount of hardening comonomer serves to facilitate polymerization of the acrylate, while the remainder, up to 25% and preferably up to 10%, is used to complete the charge which ultimately constitutes the shell.

It will thus be seen that the objects set forth above among those made apparent from the preceding description are efficiently attained and, since certain changes may be made in carrying out the above process and in the compositions set forth without departing from the scope of the invention, it is intended that all matter contained in the above description shall be interpreted as illustration and not in a limiting sense.

What is claimed is:

1. Monovinylidene interpolymer aqueous latices adapted for coating cellulosic materials comprising an interpolymer, consisting of in interpolymerized form (a) 45–65% by weight of methyl acrylate and (b) 55–35% by weight of a monovinylidene aromatic hydrocarbon, said interpolymer latices being provided by an emulsion polymerization in which an aqueous composition containing a polymerization catalyst is added at a substantially constant rate over a period of greater than about 140 minutes to an aqueous medium containing an emulsifier selected from the class consisting of anionic emulsifiers, nonionic emulsifiers and mixtures of the same and being maintained at a temperature of 40–150° C., simultaneously and at substantially constant rate adding during at least the initial 50 minutes of said period a first monomer charge and over the remainder of said period a second monomer charge, said first monomer charge comprising 30–50% of the total monomers consisting essentially of monovinylidene aromatic hydrocarbon, said second monomer comprising the remainder of said monomers 25–5% by weight of which consists of monovinylidene aromatic hydrocarbon on the total weight of the monomers.

2. The latices according to claim 1 wherein the monovinylidene aromatic hydrocarbon present in said second monomer charge consists of 10–5% by weight of the total monomers.

3. The latices according to claim 1 wherein the interpolymer consists of 50–60% by weight methyl acrylate.

4. The latices according to claim 1 wherein the monovinylidene aromatic hydrocarbon comprises styrene.

5. A coated paper product, the coating comprising dried monovinylidene interpolymer latices of claim 1.

6. The process for providing monovinylidene interpolymer aqueous latices adapted for coating cellulosic materials comprising an interpolymer consisting of in interpolymerized form (a) 45–65% by weight of methyl acrylate and (b) 55–35% by weight of monovinylidene, said process comprising an emulsion polymerization in which an aqueous composition containing a polymerization catalyst is added at a substantial constant rate over a period of greater than about 140 minutes to an aqueous medium containing an emulsifier selected from the class consisting of anionic emulsifiers, nonionic emulsifiers and mixtures of the same and being maintained at a temperature of 40–150° C., simultaneously and at constant rate adding over at least the first 50 minutes of said period a first monomer charge and over the remainder of said period a second monomer charge, said first monomer charge comprising 30–50% of the total monomers and consisting essentially of monovinylidene aromatic hydrocarbon, said second monomer charge comprising the remainder of said monomers of which 25–5% by weight consists of monovinylidene aromatic hydrocarbon on the total weight of the monomers.

7. The process according to claim 6 wherein the vinylidene aromatic hydrocarbon comprises styrene.

8. The process according to claim 6 wherein the vinylidene aromatic hydrocarbon present in said second monomer charge consists of 10–5% by weight of the total monomers.

9. The process according to claim 6 wherein the interpolymer consists of 50–60% by weight methyl acrylate.

10. The process for providing monovinylidene interpolymer aqueous latices adapted for coating cellulosic polymer materials comprising an interpolymer consisting of in interpolymerized form (a) 45–65% by weight of methyl acrylate and (b) 55–35% by weight of a monovinylidene aromatic hydrocarbon, said process comprising an emulsion polymerization in which an aqueous composition containing a polymerization catalyst is added at a substantial constant rate over a period of about 160 minutes to an aqueous medium containing an emulsifier selected from the class consisting of anionic emulsifiers, nonionic emulsifiers and mixtures of the same and being maintained at a temperature of 40–150° C., simultaneously and at constant rate adding a first monomer charge over about the initial 60 minutes of said period and a second monomer charge over the remainder of said period, said first monomer charge comprising 30–50% of the total monomers and consisting essentially of vinylidene aromatic hydrocarbon, said second monomer charge comprising the remainder of said monomers of which 10–5% by weight consists of vinylidene aromatic hydrocarbon on the total weight of the monomers.

References Cited in the file of this patent

UNITED STATES PATENTS

| 2,767,153 | Sutton | Oct. 16, 1956 |

FOREIGN PATENTS

| 713,492 | Great Britain | Aug. 11, 1954 |
| 483,551 | Canada | May 27, 1952 |
| 522,569 | Canada | Mar. 13, 1956 |